(12) United States Patent
Mathieu et al.

(10) Patent No.: US 10,598,144 B2
(45) Date of Patent: Mar. 24, 2020

(54) DEVICE FOR REVERSING A BLADE OF A RUNNER UNIT

(71) Applicant: ALSTROM RENEWABLE TECHNOLOGIES, Grenoble (FR)

(72) Inventors: Alain Mathieu, St. Nizier du Moucherotte (FR); Erwan Pein, Grenoble (FR)

(73) Assignee: GE Renewable Technologies, Grenoble (FR)

( * ) Notice: Subject to any disclaimer, the term of this patent is extended or adjusted under 35 U.S.C. 154(b) by 422 days.

(21) Appl. No.: 15/405,177

(22) Filed: Jan. 12, 2017

(65) Prior Publication Data

US 2017/0198676 A1    Jul. 13, 2017

(30) Foreign Application Priority Data

Jan. 12, 2016   (EP) .................................... 16290007

(51) Int. Cl.
| | |
|---|---|
| *F15B 15/06* | (2006.01) |
| *F03B 3/06* | (2006.01) |
| *F03B 3/14* | (2006.01) |
| *F03B 13/26* | (2006.01) |
| *F15B 15/14* | (2006.01) |

(52) U.S. Cl.
CPC ................ *F03B 3/145* (2013.01); *F03B 3/06* (2013.01); *F03B 13/264* (2013.01); *F15B 15/06* (2013.01); *F15B 15/14* (2013.01); *F05B 2210/404* (2013.01); *F05B 2260/406* (2013.01); *F05B 2260/76* (2013.01); *Y02E 10/223* (2013.01); *Y02E 10/28* (2013.01)

(58) Field of Classification Search
CPC .......... F03B 3/145; F03B 3/06; F03B 13/264; F05B 2210/404; F15B 15/06; B64C 11/38; F16H 21/38; Y02E 10/28
USPC ......................................................... 405/205
See application file for complete search history.

(56) References Cited

U.S. PATENT DOCUMENTS

| | | | |
|---|---|---|---|
| 1,753,485 A | 4/1930 | Towers | |
| 2,357,228 A * | 8/1944 | Werner | ................... F03B 3/145 416/157 R |
| 2,951,380 A | 9/1960 | Jean | |
| 6,514,044 B2 * | 2/2003 | Talasco | ................... B64C 11/30 416/155 |

(Continued)

FOREIGN PATENT DOCUMENTS

| | | | | |
|---|---|---|---|---|
| AU | 2014259522 A1 * | 5/2015 | .............. | F03B 3/145 |
| EP | 2871356 A1 | 5/2015 | | |
| GB | 750951 A | 6/1956 | | |

OTHER PUBLICATIONS

European Search Report issued in connection with corresponding EP Application No. EP16290007 dated Jun. 15, 2016.

*Primary Examiner* — Dwayne J White
*Assistant Examiner* — Wesley Le Fisher
(74) *Attorney, Agent, or Firm* — Dority & Manning, P.A.

(57) ABSTRACT

Embodiments of the present invention generally relate to a runner unit of a tidal power plant, and more particularly to a device for reversing a blade of the runner unit. The device according to the embodiments is lighter and more efficient with respect to known solutions which involve articulated mechanisms as it is based on a reversing servomotor including an annular piston which acts on the blade to be reversed.

12 Claims, 9 Drawing Sheets

(56) References Cited

U.S. PATENT DOCUMENTS

| | | | | |
|---|---|---|---|---|
| 7,296,969 B2* | 11/2007 | Raes | ............... | B64C 11/06 416/36 |
| 8,192,164 B2* | 6/2012 | Herrmann | ............... | F03B 3/06 416/157 R |
| 2016/0356260 A1* | 12/2016 | Berta | ............... | F03B 3/06 |
| 2016/0362991 A1* | 12/2016 | Bremond | ............... | F01D 7/00 |

\* cited by examiner

DEVICE FOR REVERSING A BLADE OF A RUNNER UNIT

TECHNICAL FIELD

Embodiments of the present invention generally relate to a runner unit of a tidal power plant, and more particularly to a device for reversing a blade of the runner unit.

BACKGROUND

As well known, tidal power plants are arranged to convert the energy of tides into electricity. To this purpose, in case of a tidal lagoon, a turbine housing may be arranged between the sea and the lagoon basin. The turbine housing may include a bulb runner unit comprising a plurality of blades fit thereon which are moved by the flow of water. The bulb runner is integral to a rotating shaft which cooperates with an electricity generator.

Depending on the tidal level, when the water level (also known as "head") of the sea rises with respect to the level of the lagoon, water can start flowing through the turbine to produce energy. Similarly, as the sea level starts to fall, a tidal head can be created by holding water back in the lagoon until a sufficient head is formed. Thus the process can be reversed and the water flows in the opposite direction from the lagoon to the sea through the turbine. In this way the generation of electricity is maximised, as it occurs with the flow of water in both senses.

However, the blades fit to the bulb unit usually have a fixed direction with respect to the flow of water. The consequence of such arrangement usually ensures an acceptable efficiency when the runner is operating in the direct mode, which is when the water flows from the lagoon to the sea, but at the same time a significant decrease of efficiency is experienced when operating in the reverse mode, since the same inclination of the blades is maintained in both operating modes, or at least the blades present a profile optimised for a flow in the opposite direction.

Known mechanisms installed in the runner unit usually allow an angle of rotation generally limited to values which are less than 40 degrees and in any case much less than 180 degrees (because of the dead centres of the control mechanisms). A complete inversion of the blade would correspond to a rotation angle of more than 180 degrees, for example on the order of 220 degrees.

An attempt to solve the aforementioned technical problem has been previously carried out, which will be now discussed.

With reference to FIG. 1 and the sequence illustrated in FIGS. 2A to 2F, the control mechanism generally comprises a main servomotor 12 including a piston 11 which controls the position of the blade through a rod 10. Connected to the rod 10 is a cross-head 8. Each blade includes a journal 3 supported by bearings and a lever 6 is keyed to the journal between the bearings. A connecting-rod 7 is articulated at one end to the lever 6 and to the other end to the cross-head 8. Such crank gear has a dead centre, and for this reason the control mechanism comprises an auxiliary servomotor. In particular, the latter comprises a tooth sector 13 secured to the lever 6, situated on the same side of the lever 6 and is symmetrical to the axial plane of the crank. Furthermore, an additional crank 14 is secured to toothed sector 15 and rotates on a pin 16 mounted on the hub. A connecting-rod 17 is articulated at the end of the crank 14 and is driven by an auxiliary servomotor 18. As it is clearly indicated in the sequence of FIGS. 2A-2F, toothed sectors 13 and 15 interact solely when the main servomotor 12 drives the lever 6 in its dead position (FIGS. 2B-2E). Then the auxiliary mechanism is driven such that toothed sector 15 meshes with sector 13 and the dead centre is passed. With the cooperation of the two mechanisms a complete inversion of the blade, with an angle greater than 180 degrees, is achieved.

However, the disclosed mechanism has technical disadvantages. In fact, the auxiliary mechanism is based on a rotative gear, which is the toothed sector 15, in order to enable the further rotation of the lever 6 and hence pass the dead zone. For such reason, the auxiliary servomotor, which comprises the servomotor 18 acting on the connecting-rod 17, must include the crank 14 articulated thereto.

It will be appreciated that such pivot in the mechanism inevitably involves the presence of two elements moving, that is the articulated rod 17 and the crank 14 on which the meshing gear is provided, which makes the mechanism heavier and may cause wear at the interface of the coupling rod-crank. Furthermore, the hub must be designed to also support the pin 16 acting as pivot of the crank 14, and the pin 20 acting as pivot of the servomotor 22 as they are both fixed thereto.

BRIEF DESCRIPTION

It is an object of the present invention to solve the aforementioned technical problems by providing a device for reversing a blade for a runner unit as substantially defined herein.

It is a further object of the present invention to provide a runner unit as substantially defined herein.

According to an aspect of the invention, this object is obtained by a device for reversing a blade of a runner unit, comprising an annular lever fixed to a trunnion portion of the blade and rotatably mounted on the runner unit; a main servomotor comprising a first piston adapted to reciprocate along a shaft of the runner unit and coupled to the annular level such to cause a first rotation of the blade until the piston reaches a dead zone position; a reversing servomotor including a second piston arranged to cause a further rotation of the blade from the dead zone position; and a connecting rod having a first end connected to the second piston and a second end eccentrically fixed on the annular lever.

According to an aspect of the invention, the reversing servomotor is adapted to reciprocate along the shaft of the runner unit.

According to an aspect of the invention, the second piston is annular-shaped and arranged concentric to the first piston.

According to an aspect of the invention, the first end of the rod has an eyelet arranged to cooperate with a pivot fixed on the second piston, and the eyelet is configured such to establish a movement relative to the pivot during motion of the main servomotor.

According to an aspect of the invention, the pivot is located on an internal wall of the second piston.

According to an aspect of the invention, the reversing servomotor is oil-operated.

According to an aspect of the invention, the annular lever comprises a pin eccentric with respect to an axis of rotation of the annular lever, the pin being hosted in a groove formed in the piston of the main servomotor.

According to an aspect of the invention, the device further comprises a nut arranged around the pin and within the groove.

According to an aspect of the invention, the main servomotor is oil-operated.

BRIEF DESCRIPTION OF THE DRAWINGS

The objects, advantages and other features of the present invention will become more apparent upon reading of the following non-restrictive description of embodiments thereof, given for the purpose of exemplification only, with reference to the accompany drawing, through which similar reference numerals may be used to refer to similar elements, and in which.

An exemplary embodiment will be now described with reference to the aforementioned drawings.

DETAILED DESCRIPTION

Figure 1:
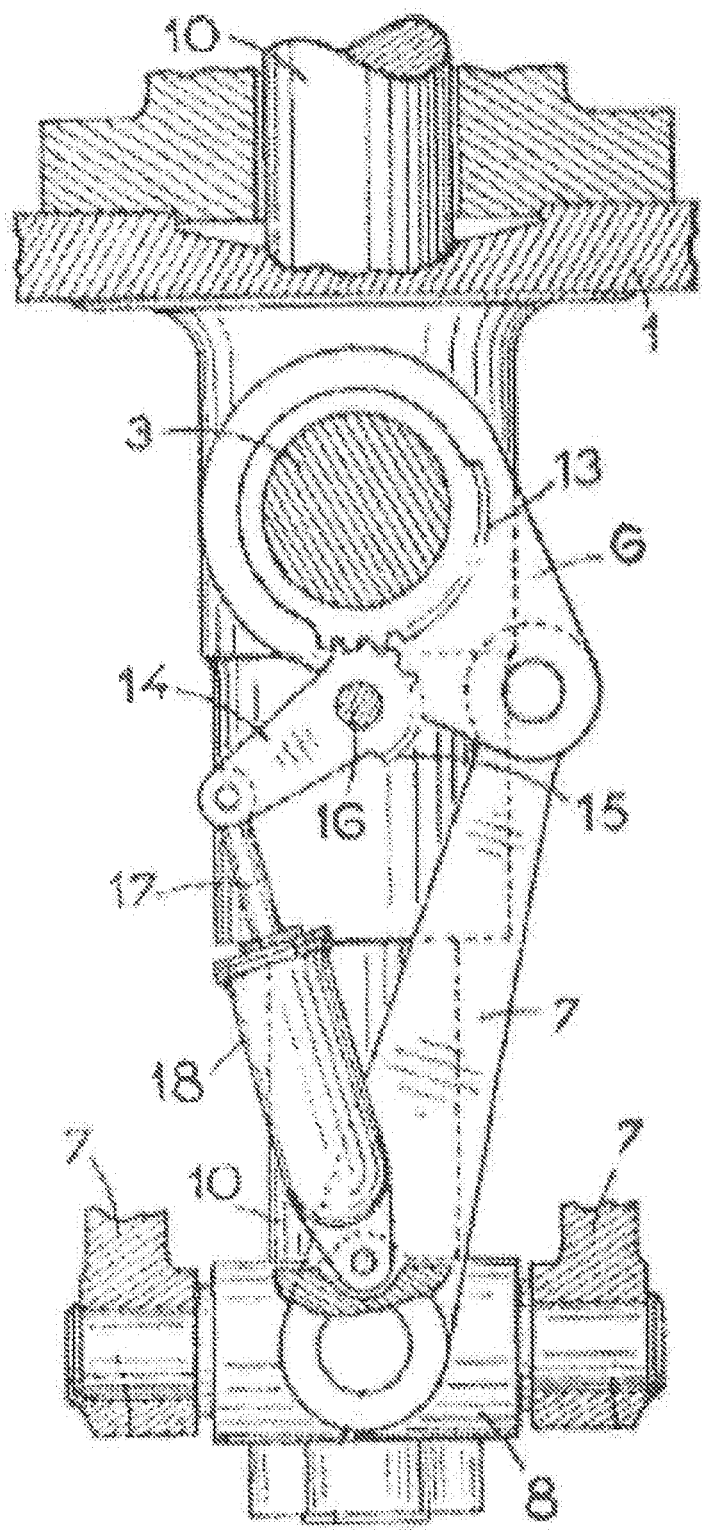
FIG. 1 shows a control mechanism for reversing a blade according to the prior art.
Figure 2F:
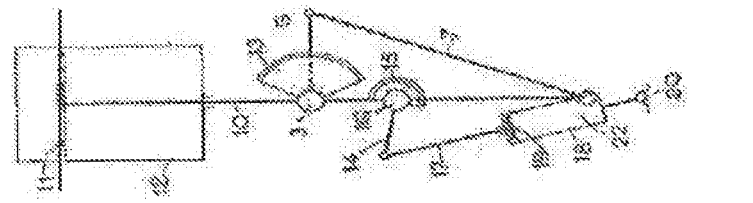
FIGS. 2A, 2B, 2C, 2D, 2E, and 2F show a sequence of the various configurations of the control mechanism of FIG. 1 during operation.
Figure 2E:
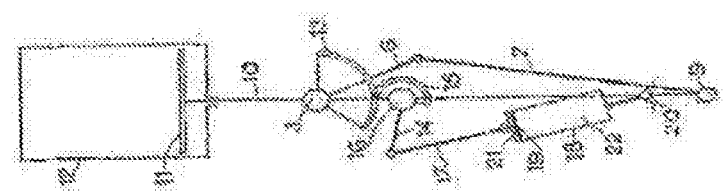
Figure 2D:
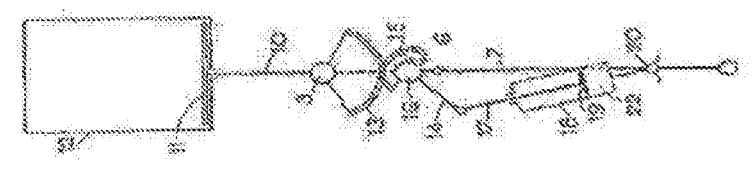
Figure 2C:
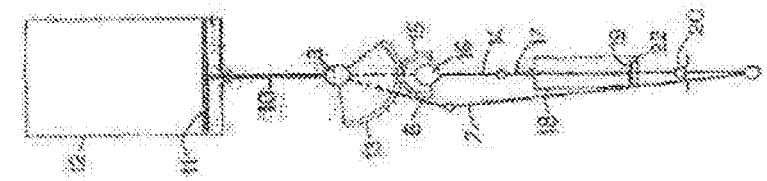
Figure 2B:
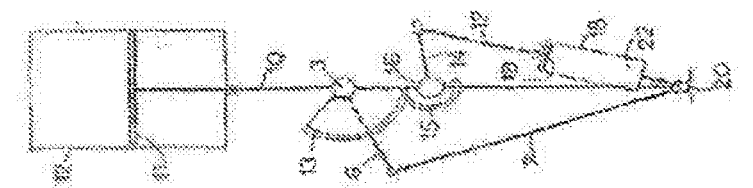
Figure 2A:
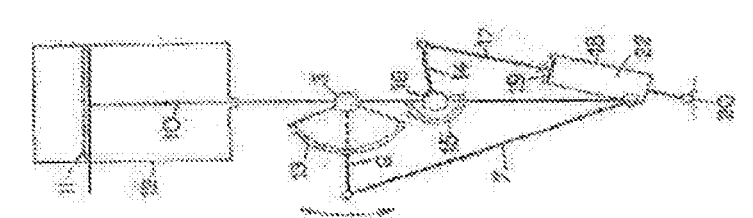
Figure 3:
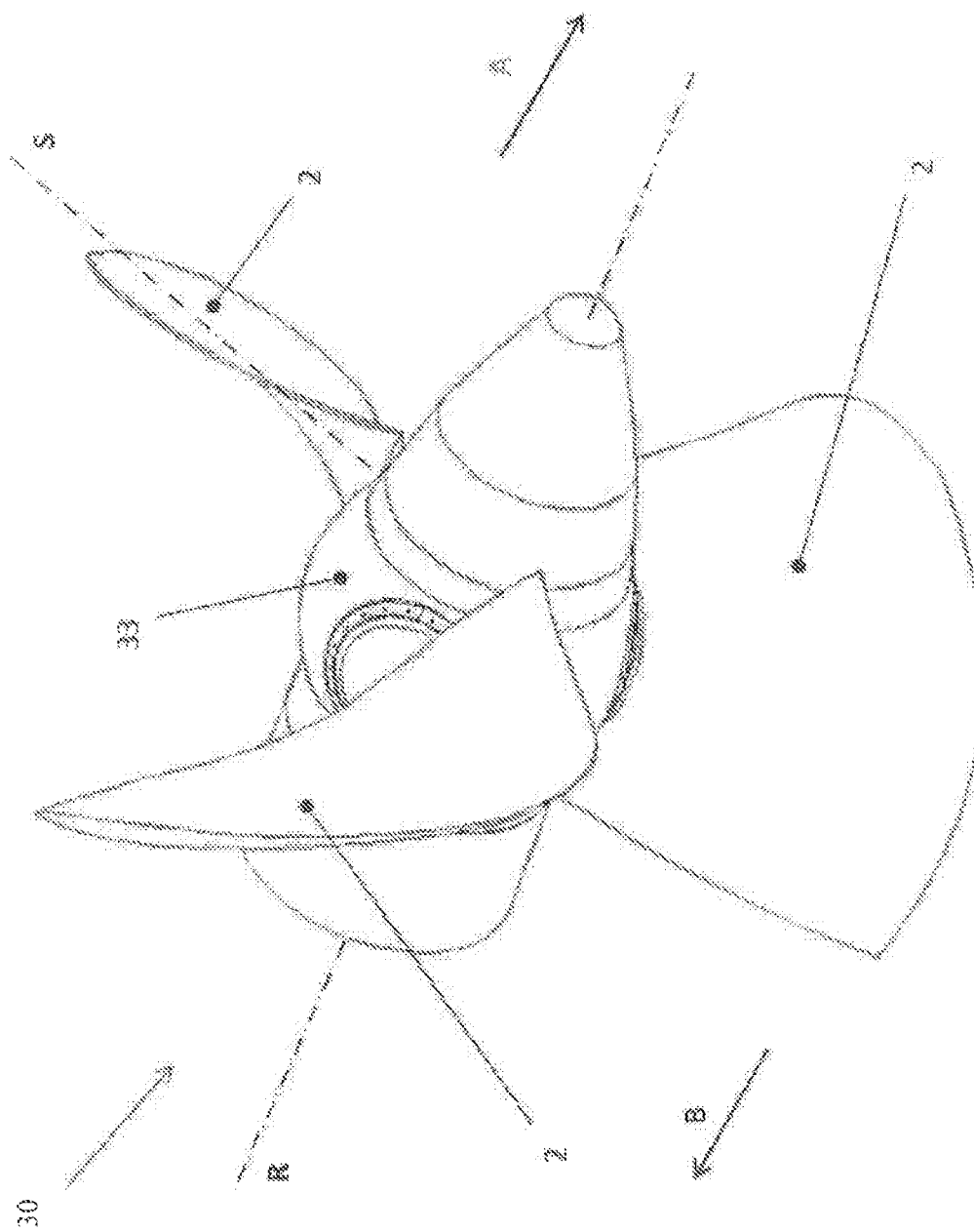
FIG. 3 shows a perspective view of a runner unit including a plurality of blades according to an embodiment of the present invention.

With reference to FIG. 3, shown therein is a runner unit, generally indicated with numeral reference 30. The runner unit 30 is located within a tidal power plant which may be positioned between the sea and a lagoon basin (arrangement not shown). Runner unit 30 includes a hub body 33 to which a plurality of blades 2 are fitted. Each blade 2 comprises an airfoil mounted on the hub body 33 and it is moved by a flow of water which may occur in a direct mode, that is from the lagoon to the sea along verse indicated by arrow A, and in a reverse mode, that is from the sea to the lagoon along the direction indicated by arrow B. The flow of water generates a rotation of hub body 33 about an axis R that is transferred to a shaft (not visible) which is in turn connected to an electric generator (not shown) for the generating of electricity.

The same working principle can also be applied with the runner operating in the so-called pump mode, where the runner is driven by its motor-generator to move a fluid for example from a lower reservoir to a higher reservoir.

The following description is directed to a device for reversing a blade 2 around a rotational axis S arranged substantially perpendicular to the hub body 33. It will be appreciated that a device according to an embodiment of the invention will be provided for each blade 2 of the runner unit 30.

Figure 4:
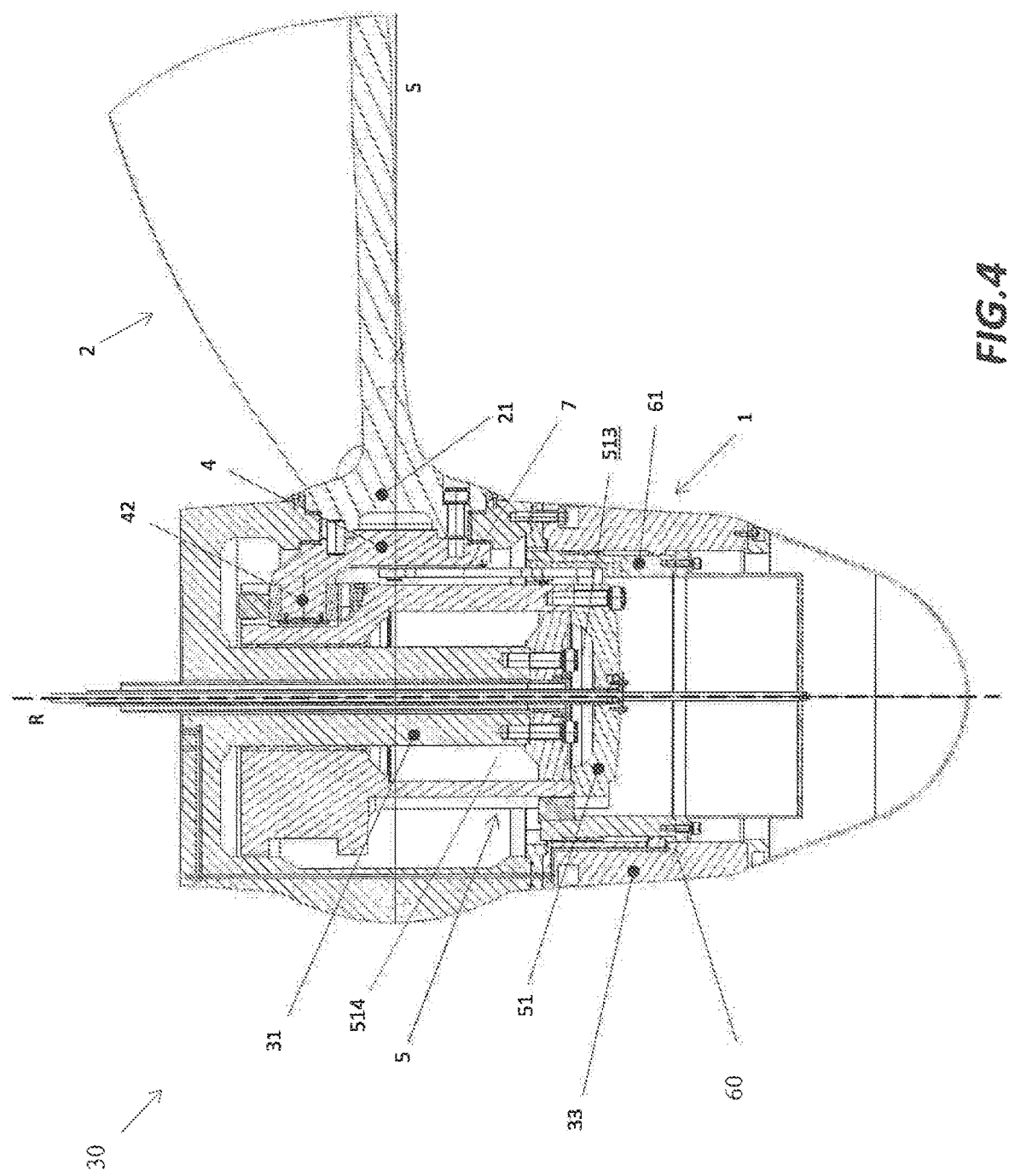
FIG. 4 shows a side section view of a runner unit according to an embodiment of the present invention.

Making now reference to following FIG. 4, it is shown a section view of runner unit 30 along a plane which contains both axis rotational axis R and S. The blade 2 is rotatably connected to hub body 33 by means of a trunnion portion 21 of the blade which is secured to an annular level 4, rotatable about the axis S on the runner unit 30. Annular lever 4 is coupled to a main servomotor 5 which comprises a piston 51 adapted to reciprocate along a shaft 31 of the runner unit 30. The coupling is arranged such that the position of the piston 51 along the shaft 31 determines the angular position of the blade with respect to rotational axis S, as it will be clear in the following detailed description of an embodiment.

In an embodiment, the main servomotor is of an oil type, and the displacement of the piston 51 occurs by controlling, by a dedicated pressured fluid feeding system (not shown), the difference of pressure established within chambers 513 and 514. More specifically, when the thrust created by the pressure in chamber 513 exceeds the thrust created by pressure of chamber 514 the piston moves upwards, and vice versa.

In this non-limiting exemplary embodiment, the annular lever 4 and the piston 51 are coupled by means of a pin 42, integral to the annular lever 4 and eccentric versus axis S, that is the axis of rotation of the lever. Pin 42 is hosted into a groove formed into the piston 51.

The runner unit 30 internally includes a device, generally indicated with numeral reference 1, for the carrying out a partial rotation of the blade 2 beyond a dead zone. To this aim, device 1 according to an embodiment of the invention comprises a reversing servomotor 60, adapted to reciprocate along the shaft 31, which in turn includes a second piston 61 arranged to cause a further rotation of the blade 2 after main servomotor has positioned the latter in proximity of the dead zone, as it will be clearly explained with reference to the following figures.

In an embodiment, the second piston 61, which is depicted in a section view, is annular shaped and is arranged concentric to the first piston 51 of main servomotor 5.

Moreover, device 1 comprises a connecting rod 7 which has a first end 71 connected to the second piston 61 and a second end 72 which is in turn eccentrically fixed on the annular lever 4.

With reference to the following sequence of FIGS. 5-9 the mode of operation of the device for reversing the blade will be described in details.

Figure 5:
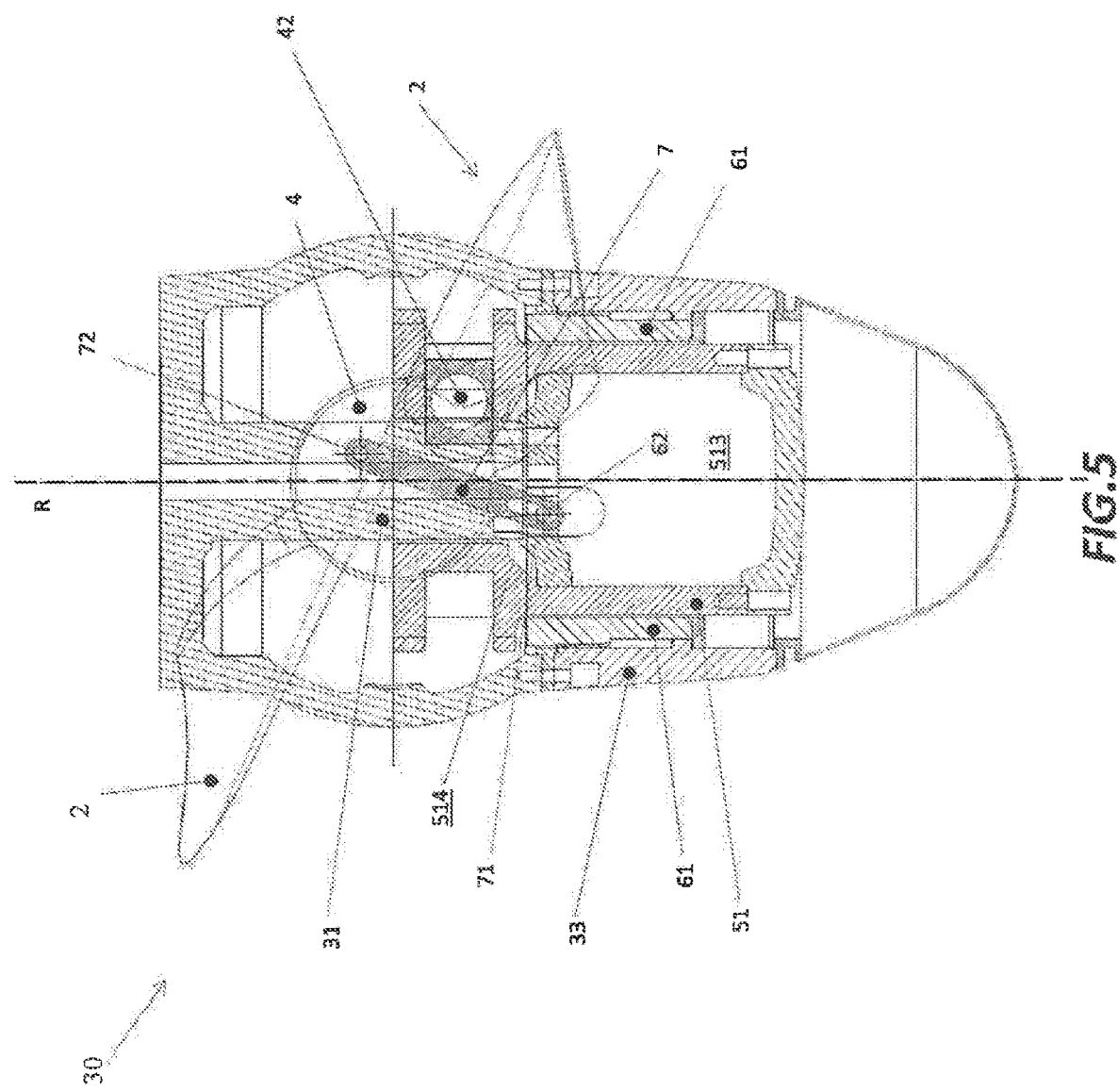
FIGS. 5, 6, 7, 8, and 9 show a front section view of the runner in a sequence of steps to reverse the blade by means of a device according to an embodiment of the present invention.

FIG. 5 shows a front section of the runner unit 30 where the blade 2 is frontally visible. In this view, axis R is still visible whilst rotational axis S is perpendicular to the section plane shown.

Connecting rod 7 is linked between the second piston 61 of the reversing servomotor and the annular lever 4. In the configuration shown in FIG. 5, after the runner 3 has been stopped for performing the blade inversion, the first piston 51 of the main servomotor is positioned downwards along its stroke relative to the shaft 31, whilst the servomotor 60 is in its upward position.

Figure 6:
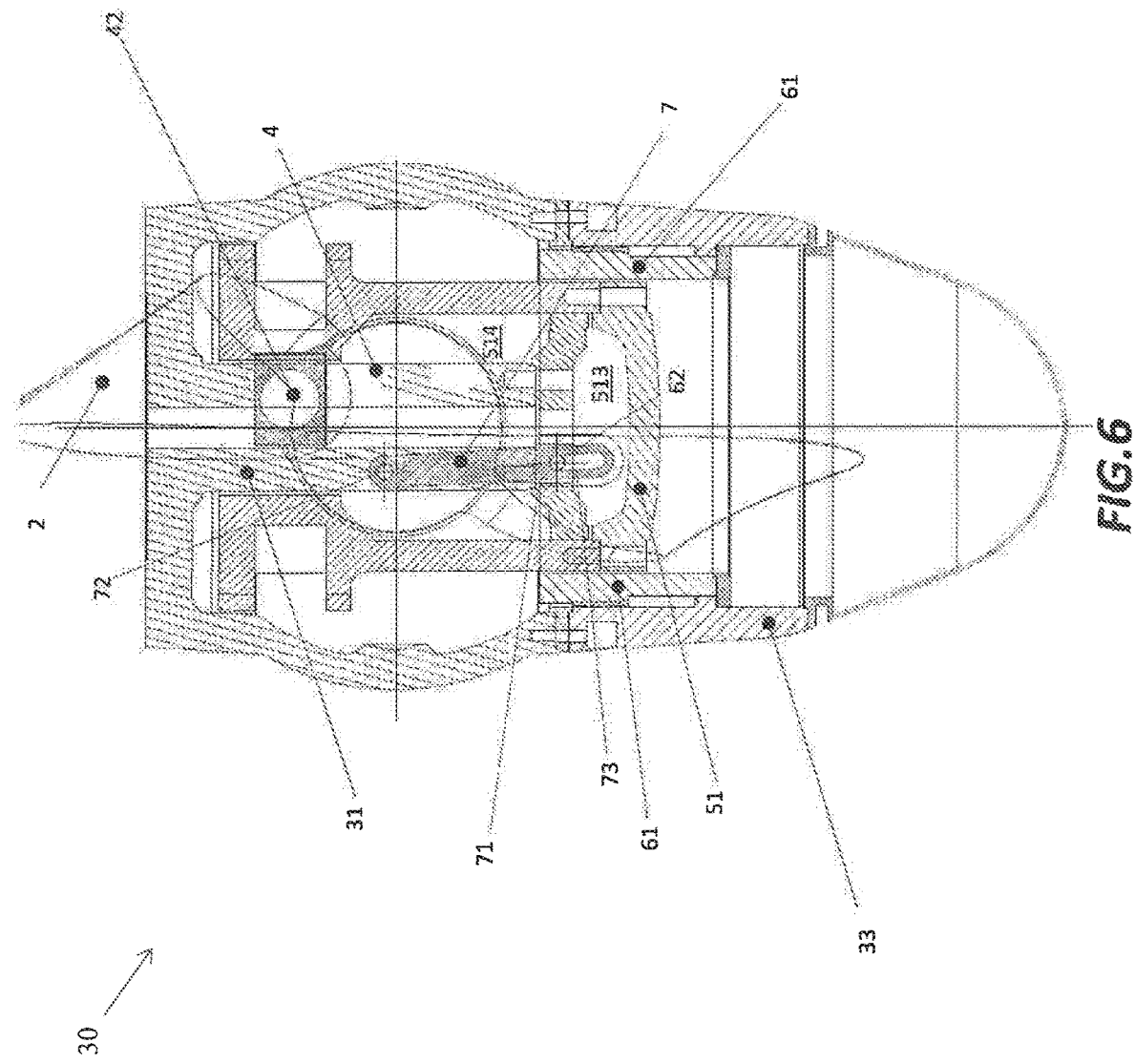

Subsequently, as shown in FIG. 6, the first piston 51 is moved upwards such to rotate the blade 2 until the proximity of the dead zone is reached.

The counter clockwise rotation of the blade 2 determines the correspondent rotation of the annular lever 4, which is in turn fixed to the second end 72 of the connecting rod 7, which is dragged into the rotational movement as well. Differently, as clearly visible in FIG. 6, the first end 71 of the connecting rod 7 has an eyelet 73 which is arranged to cooperate with a pivot 62 fixed on the second piston 61, more specifically located on an internal wall of the latter. The connection between rod 7 and the second piston 61 through the eyelet 73 establishes a movement of the rod 7 relative to the pivot 62 during the motion of the first piston 51.

Consequently, during the upwards movement of the first piston 51 and the counter clockwise rotation of the blade 2 (and the annular lever 4) until the dead zone is reached, the second end 72 of the connecting rod 7 follows the rotation of the lever 4 and also determines a motion relative to the pivot 62 integral to the second piston 61, which then is not affected by said rotation.

A suitable sizing of the eyelet, taking into account of the overall geometry of the runner (including for example the dimensions of the annular lever 4 and eccentricity of the connecting rod 7 on the latter) is necessary to ensure a correct synchronization of the main and reversing servomotors 5 and 6.

Figure 7:
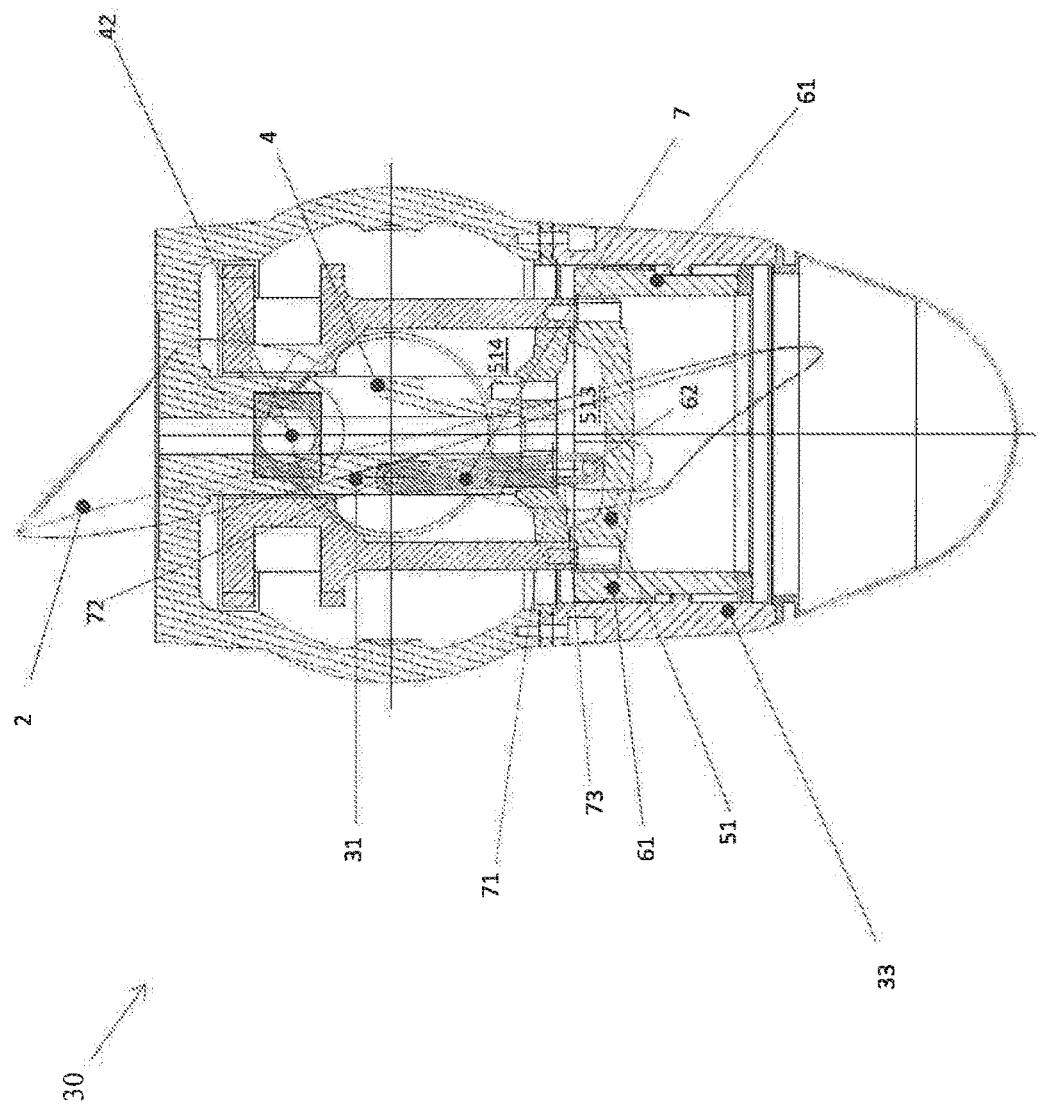

With reference to FIG. 7, with the blade 2 being positioned into the dead zone, the second piston 61 starts a downward motion until pivot 62 abuts against a low end of the eyelet 73. In this fashion, piston 61 may be considered the "master", whilst piston 51 the "slave".

The reversing servomotor, and particularly second piston 61, is also oil-operated and is associated to an oil feeding circuit (not shown in the figure) for enabling its reciprocating motion along shaft 31 of the runner unit 30. More particularly, two separated circuits are provided within the runner unit, that is one for the upward movement and a second for the downward movement.

Figure 8:
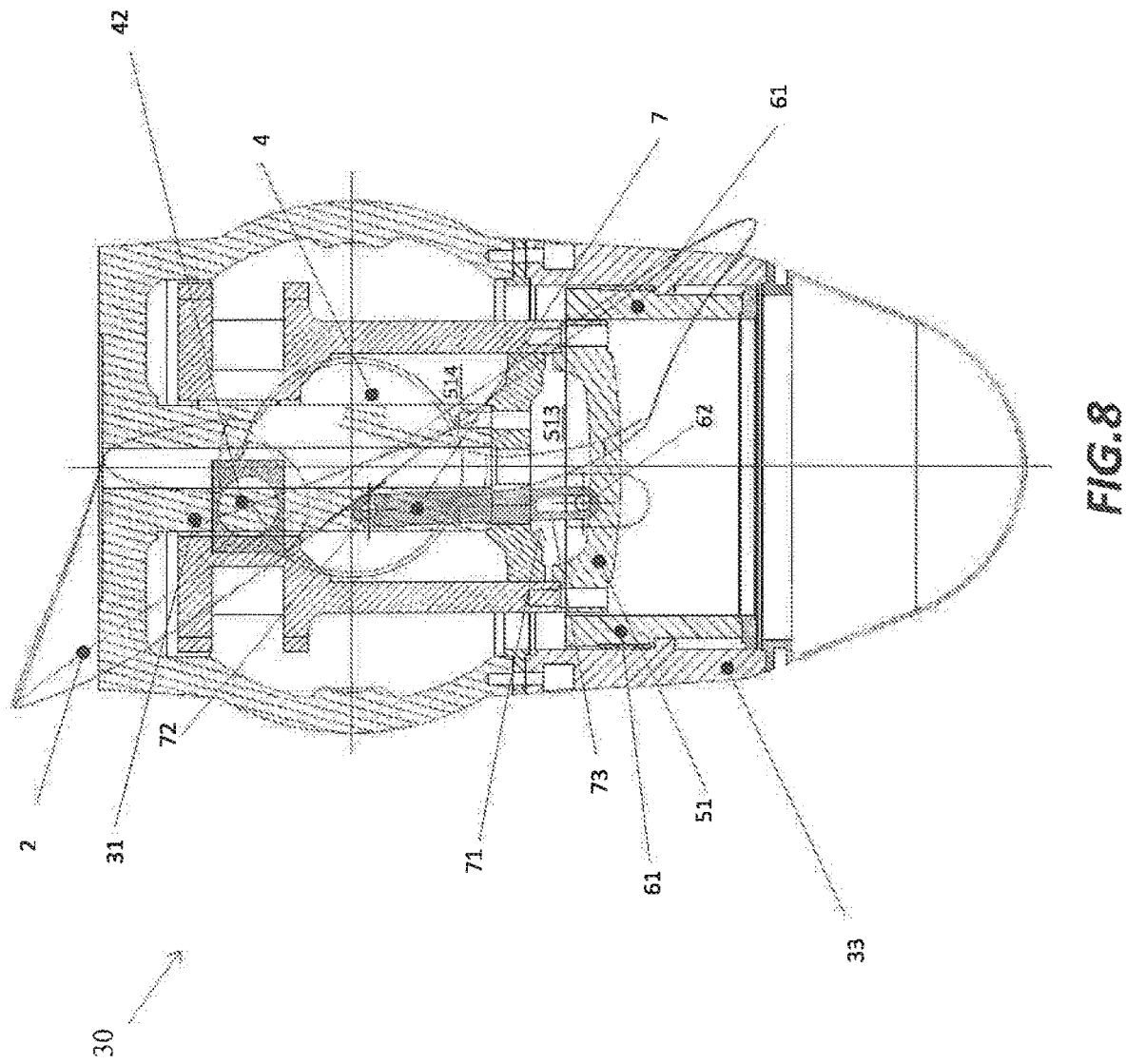

With reference to FIG. 8, the motion of piston 61 drives the connecting rod 7 downwards, and therefore the annular lever 4 is further rotated counter clockwise. The further rotation of the annular lever 4 thus determines the additional partial rotation of the blade 2 beyond the dead zone.

Figure 9:
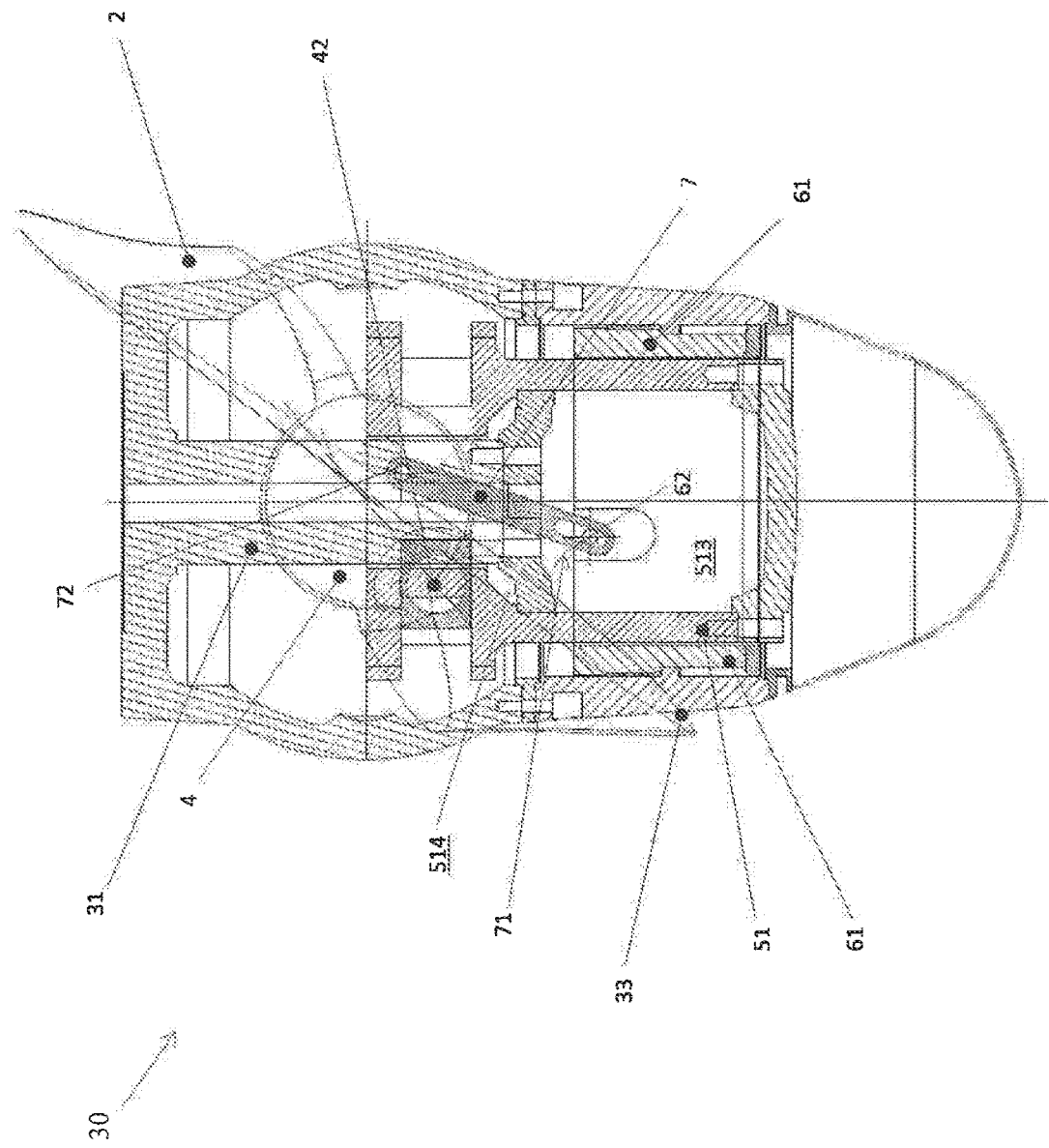

At this point, as shown in FIG. 9, the main servomotor 5 is again activated and it is moved downwards to complete the inversion of the blade 2. After the complete rotation of the blade is carried out, the runner unit 30 may be again activated.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A device for reversing a blade of a runner unit, the device comprising:
    an annular lever fixed to a trunnion portion of the blade and rotatably mounted on the runner unit;
    a main servomotor comprising a first piston cylinder adapted to reciprocate along a shaft of the runner unit and coupled to said annular lever so as to cause a first rotation of the blade until said first piston cylinder reaches a dead zone position, said annular lever comprising a pin eccentric with respect to an axis of rotation of said annular lever, said pin being hosted in a groove formed in said first piston cylinder;
    a reversing servomotor including a second piston cylinder arranged to cause a further rotation of the blade from said dead zone position; and
    a connecting rod having a first end connected to said second piston cylinder and a second end eccentrically fixed on said annular lever, wherein said second piston cylinder is annular-shaped and is arranged concentric with and surrounding said first piston cylinder, said first piston cylinder being received within second piston cylinder.

2. The device according to claim 1, wherein said reversing servomotor is adapted to reciprocate along the shaft of the runner unit.

3. The device according to claim 1, wherein said first end of said connecting rod has an eyelet arranged to cooperate with a pivot fixed on said second piston cylinder, wherein said eyelet is configured to establish a movement relative to said pivot during motion of said main servomotor.

4. The device according to claim 3, wherein said pivot is located on an internal wall of said second piston cylinder.

5. The device according to claim 1, wherein said reversing servomotor is oil-operated.

6. The device according to claim 1, further comprising a nut arranged around said pin and within said groove.

7. The device according to claim 1, wherein said main servomotor is oil-operated.

8. A system comprising:
    a runner unit having a shaft and at least one blade rotatably mounted on the shaft; and
    a device for reversing the blade, the device comprising:
        an annular lever fixed to a trunnion portion of the blade and rotatably mounted on the runner unit;
        a main servomotor comprising a first piston cylinder adapted to reciprocate along the shaft of the runner unit and coupled to said annular level to cause a first rotation of the blade until said first piston cylinder reaches a dead zone position, said annular lever comprising a pin eccentric with respect to an axis of rotation of said annular lever, said pin being hosted in a groove formed in said first piston cylinder;
        a reversing servomotor including a second piston cylinder arranged to cause a further rotation of the blade from said dead zone position; and
        a connecting rod having a first end connected to said second piston cylinder and a second end eccentrically fixed on said annular lever, wherein said second piston cylinder is annular-shaped and is arranged concentric with and surrounding said first piston cylinder, said first piston cylinder being received within second piston cylinder.

9. The system according to claim 8, wherein said reversing servomotor is adapted to reciprocate along the shaft of the runner unit.

10. The system according to claim 8, wherein said first end of said connecting rod has an eyelet arranged to cooperate with a pivot fixed on said second piston cylinder, wherein said eyelet is configured to establish a movement relative to said pivot during motion of said main servomotor.

11. The system according to claim 10, wherein said pivot is located on an internal wall of said second piston cylinder.

12. The system according to claim 8, wherein said reversing servomotor is oil-operated.

* * * * *